United States Patent
Zhang et al.

(10) Patent No.: US 11,184,898 B2
(45) Date of Patent: Nov. 23, 2021

(54) SYSTEM AND METHOD FOR ALLOCATING RESOURCE BLOCKS

(71) Applicant: ZTE CORPORATION, Guangdong (CN)

(72) Inventors: Wen Zhang, Shenzhen (CN); Shuqiang Xia, Shenzhen (CN); Jing Shi, Shenzhen (CN); Xianghui Han, Shenzhen (CN); Chunli Liang, Shenzhen (CN); Min Ren, Shenzhen (CN)

(73) Assignee: ZTE CORPORATION, Shenzhen (CN)

( * ) Notice: Subject to any disclaimer, the term of this patent is extended or adjusted under 35 U.S.C. 154(b) by 98 days.

(21) Appl. No.: 16/709,318

(22) Filed: Dec. 10, 2019

(65) Prior Publication Data
US 2020/0120681 A1     Apr. 16, 2020

Related U.S. Application Data (63) Continuation of application No. PCT/CN2017/088712, filed on Jun. 16, 2017.

(51) Int. Cl.
*H04W 72/04* (2009.01)
*H04W 72/02* (2009.01)

(52) U.S. Cl.
CPC ....... *H04W 72/0493* (2013.01); *H04W 72/02* (2013.01); *H04W 72/042* (2013.01)

(58) Field of Classification Search
CPC . H04W 72/04; H04W 72/02; H04W 72/0493; H04W 72/042
See application file for complete search history.

(56) References Cited

U.S. PATENT DOCUMENTS

| | | | |
|---|---|---|---|
| 2013/0072242 A1 | 3/2013 | Iwai et al. | |
| 2014/0219202 A1* | 8/2014 | Kim | H04W 72/0413 370/329 |
| 2015/0208395 A1 | 7/2015 | Seo et al. | |

(Continued)

FOREIGN PATENT DOCUMENTS

| | | |
|---|---|---|
| CN | 103327615 A | 9/2013 |
| WO | WO-2010/016737 A2 | 2/2010 |
| WO | WO-2017/076206 A1 | 5/2017 |

OTHER PUBLICATIONS

Extended European Search Report on EP 17913380.6 dated May 4, 2020 (8 pages).

(Continued)

*Primary Examiner* — Chi Ho A Lee
(74) *Attorney, Agent, or Firm* — Foley & Lardner LLP (57) ABSTRACT

A system and method for allocating network resources are disclosed herein. In one embodiment, the system and method are configured to perform: determining a resource indication value based on a combination of at least two of a first parameter, a second, and a third parameter, the resource indication value indicative of respective identifiers of a sequence of resource blocks to be allocated to a communication node, wherein the resource indication value is determined by a predefined relationship between the combination of the at least two of the first, second, and third parameters; and transmitting the resource indication value to the communication node.

20 Claims, 5 Drawing Sheets

(56) References Cited

U.S. PATENT DOCUMENTS

| | | | |
|---|---|---|---|
| 2015/0245340 A1* | 8/2015 | Cheng | H04W 48/12 |
| | | | 370/331 |
| 2016/0044638 A1* | 2/2016 | Gao | H04L 1/1896 |
| | | | 370/280 |
| 2016/0105885 A1* | 4/2016 | Wang | H04W 72/0413 |
| | | | 370/329 |
| 2018/0338301 A1* | 11/2018 | Gao | H04L 1/1896 |
| 2019/0349896 A1* | 11/2019 | Yu | H04W 72/042 |
| 2019/0356459 A1* | 11/2019 | Wang | H04W 76/27 |
| 2020/0077433 A1* | 3/2020 | Lin | H04W 72/0446 |
| 2020/0213997 A1* | 7/2020 | Lu | H04W 72/0413 |

OTHER PUBLICATIONS

Pantech: "On the non-contiguous UL resource allocation", 3GPP TSG-RAN WG1 #60, Draft; RI-100989, San Francisco, Feb. 16, 2010 (6 pages).

International Search Report and Written Opinion of the International Searching Authority on International Application No. PCT/CN2017/088712, dated Feb. 24, 2018.

* cited by examiner

SYSTEM AND METHOD FOR ALLOCATING
RESOURCE BLOCKS

CROSS-REFERENCE TO RELATED
APPLICATION

This application claims the benefit of priority under 35 U.S.C. § 120 as a continuation of PCT Patent Application No. PCT/CN2017/088712 filed on Jun. 16, 2017, the content of which is incorporated herein by reference in its entirety.

TECHNICAL FIELD

The disclosure relates generally to wireless communications and, more particularly, to systems and methods for allocating resource blocks.

BACKGROUND

In wireless communications, when a base station (BS) is preparing to transmit and receive data from a user equipment (UE), a scheduling process is typically performed before the BS actually transmits and receives the data from the UE. Such a scheduling process typically provides some control information (e.g., downlink control information (DCI)) that is transmitted through one or more physical channels (e.g., physical downlink control channel (PDCCH)) to the UE. In particular, the control information comprises various specified parameters that the UE may use for receiving and transmitting the data such as, for example, parameters for resource block allocation.

In general, the BS has various ways for allocating respective resource blocks to the UE through downlink and uplink communications. In the downlink communication, the above-mentioned DCI that comprises the parameters for resource block allocation can be provided in various formats (hereinafter "DCI formats"). For example, the BS uses a resource indication value (RIV) to indicate a respective contiguous sequence of resource blocks that can be used by the UE, and more specifically, the RIV is determined based on a starting resource block and a length of the contiguous sequence of resource blocks, which is typically known as DCI format 1A or 1B.

Based on different amounts of the resource blocks desired to be allocated, the RIV is typically presented as a range of integer values (e.g., 0 to 20), and is then used to determine how many bits (digital bits) the BS/UE will need to accommodate all the values of the RIV. For example, when RIV ranges from 0 to 20, the number of bits that can accommodate all the values of the RIV (i.e., 21) is at least 5 (because $2^5>21>2^4$).

Existing formats to allocate the resource blocks, including the above-mentioned type 2 downlink DCI format and uplink type 0 DCI format, are directed to allocating one or more "contiguous" sequence of resource blocks such as, for example, plural sequences with a common fixed starting resource block location but each with a "contiguously" increasing/decreasing length of resource blocks, plural sequences with a common fixed length of the resource blocks but each with a "contiguously" increasing/decreasing starting resource block location, etc.

In the 5G network, however, various communication demands for respective applications (e.g., Internet of Things (IoT), massive Machine Type Communication (mMTC), etc.), are emerging, which may require one or more non-contiguous sequences of resource blocks to be used. For example, in some cases, plural sequences of resource blocks may be desired, wherein the plural sequences of resource blocks have a common fixed starting resource block location but each has a "non-contiguously" increasing/decreasing length (e.g., 5, 10, 15, 20, etc.) of the resource blocks. Existing formats for allocating resource blocks, however, require the starting resource block location and/or length of the resource block sequences to increase/decrease contiguously. Thus, for non-contiguously increasing or decreasing RB sequence lengths, or non-contiguous RB sequence starting locations, such existing formats would require extra overhead bits to account for such variations and, thus disadvantageously cause a waste of bits. Therefore, existing formats and/or techniques for allocating resource blocks are not entirely satisfactory.

SUMMARY OF THE INVENTION

The exemplary embodiments disclosed herein are directed to solving the issues relating to one or more of the problems presented in the prior art, as well as providing additional features that will become readily apparent by reference to the following detailed description when taken in conjunction with the accompany drawings. In accordance with various embodiments, exemplary systems, methods, devices and computer program products are disclosed herein. It is understood, however, that these embodiments are presented by way of example and not limitation, and it will be apparent to those of ordinary skill in the art who read the present disclosure that various modifications to the disclosed embodiments can be made while remaining within the scope of the invention.

In one embodiment, a method includes: determining a resource indication value based on a combination of at least two of a first parameter, a second, and a third parameter, the resource indication value indicative of respective identifiers of a sequence of resource blocks to be allocated to a communication node, wherein the resource indication value is determined by a predefined relationship between the combination of the at least two of the first, second, and third parameters; and transmitting the resource indication value to the communication node.

In a further embodiment, a method includes: receiving, by a communication node, a resource indication value determined based on a combination of at least two of a first parameter, a second parameter, and a third parameter, the resource indication value indicative of respective identifiers a sequence of resource blocks to be allocated to the communication node, wherein the resource indication value is limited by a predefined relationship between the combination of at least two of the first, second, and third parameters; and based on the received resource indication value, determining the respective identifiers of the sequence of resource blocks allocated to the communication node.

In another embodiment, a first communication node includes: at least one processor configured to determine a resource indication value based on a combination of at least two of a first parameter, a second, and a third parameter, the resource indication value indicative of respective identifiers of a sequence of resource blocks to be allocated to a second communication node, wherein the resource indication value is determined by a predefined relationship between the combination of the at least two of the first, second, and third parameters; and a transmitter configured to transmit the resource indication value to the second communication node.

In yet another embodiment, a communication node, includes: a receiver configured to receive a resource indication value determined based on a combination of at least two of a first parameter, a second parameter, and a third parameter, the resource indication value indicative of respective identifiers a sequence of resource blocks to be allocated to the communication node, wherein the resource indication value is limited by a predefined relationship between the combination of at least two of the first, second, and third parameters; and at least one processor configured to determine the respective identifiers of the sequence of resource blocks allocated to the communication node based on the received resource indication value.

BRIEF DESCRIPTION OF THE DRAWINGS

Various exemplary embodiments of the invention are described in detail below with reference to the following Figures. The drawings are provided for purposes of illustration only and merely depict exemplary embodiments of the invention to facilitate the reader's understanding of the invention. Therefore, the drawings should not be considered limiting of the breadth, scope, or applicability of the invention. It should be noted that for clarity and ease of illustration these drawings are not necessarily drawn to scale.

DETAILED DESCRIPTION OF EXEMPLARY EMBODIMENTS

Various exemplary embodiments of the invention are described below with reference to the accompanying figures to enable a person of ordinary skill in the art to make and use the invention. As would be apparent to those of ordinary skill in the art, after reading the present disclosure, various changes or modifications to the examples described herein can be made without departing from the scope of the invention. Thus, the present invention is not limited to the exemplary embodiments and applications described and illustrated herein. Additionally, the specific order or hierarchy of steps in the methods disclosed herein are merely exemplary approaches. Based upon design preferences, the specific order or hierarchy of steps of the disclosed methods or processes can be re-arranged while remaining within the scope of the present invention. Thus, those of ordinary skill in the art will understand that the methods and techniques disclosed herein present various steps or acts in a sample order, and the invention is not limited to the specific order or hierarchy presented unless expressly stated otherwise.

Figure 1:
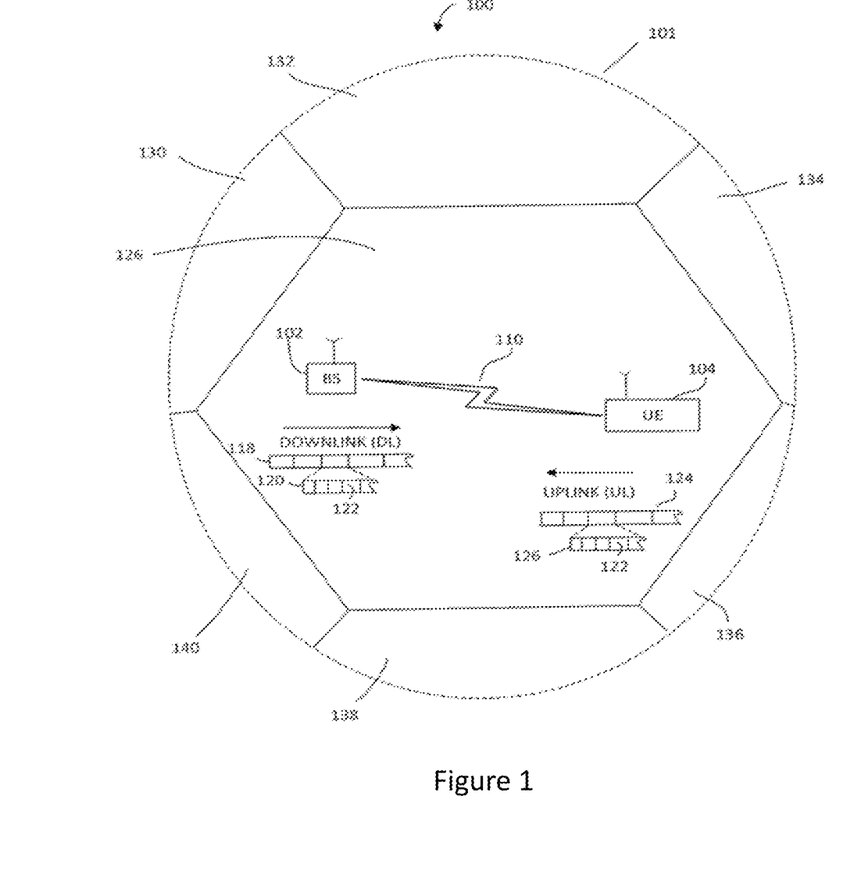
FIG. 1 illustrates an exemplary cellular communication network in which techniques disclosed herein may be implemented, in accordance with an embodiment of the present disclosure.

FIG. 1 illustrates an exemplary wireless communication network 100 in which techniques disclosed herein may be implemented, in accordance with an embodiment of the present disclosure. The exemplary communication network 100 includes a base station 102 (hereinafter "BS 102") and a user equipment device 104 (hereinafter "UE 104") that can communicate with each other via a communication link 110 (e.g., a wireless communication channel), and a cluster of notional cells 126, 130, 132, 134, 136, 138 and 140 overlaying a geographical area 101. In FIG. 1, the BS 102 and UE 104 are contained within the geographic boundary of cell 126. Each of the other cells 130, 132, 134, 136, 138 and 140 may include at least one base station operating at its allocated bandwidth to provide adequate radio coverage to its intended users. For example, the base station 102 may operate at an allocated channel transmission bandwidth to provide adequate coverage to the UE 104. The base station 102 and the UE 104 may communicate via a downlink radio frame 118, and an uplink radio frame 124 respectively. Each radio frame 118/124 may be further divided into sub-frames 120/126 which may include data symbols 122/128. In the present disclosure, the BS 102 and UE 104 are described herein as non-limiting examples of "communication nodes," generally, which can practice the methods disclosed herein. Such communication nodes may be capable of wireless and/or wired communications, in accordance with various embodiments of the invention.

Figure 2:
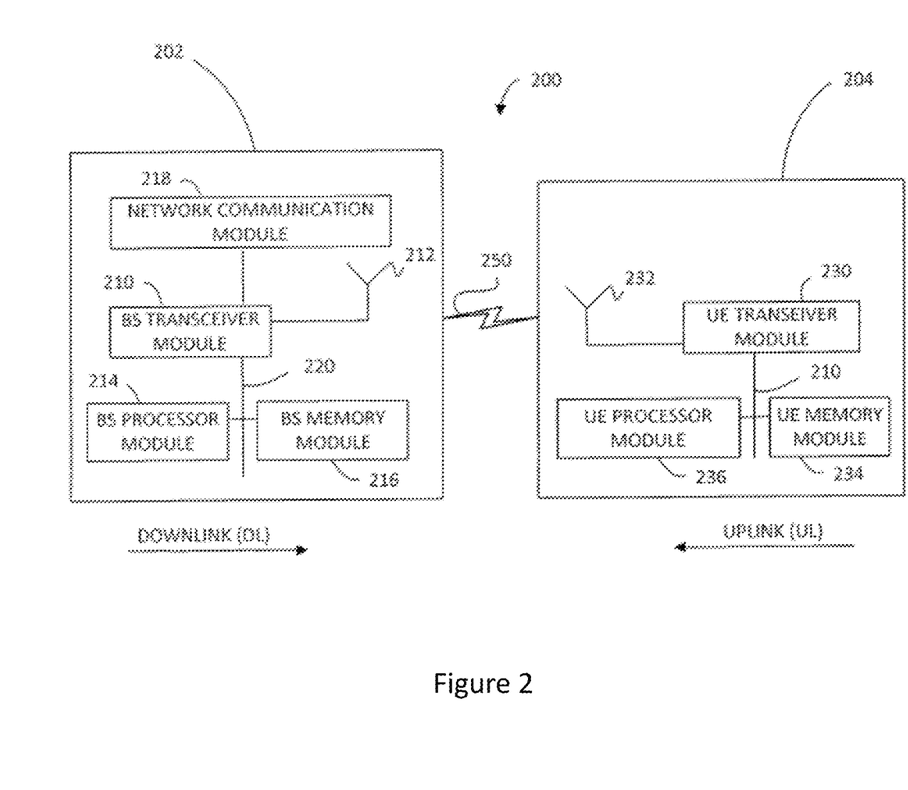
FIG. 2 illustrates block diagrams an exemplary base station and a user equipment device, in accordance with some embodiments of the present disclosure.

FIG. 2 illustrates a block diagram of an exemplary wireless communication system 200 for transmitting and receiving wireless communication signals, e.g., OFDM/OFDMA signals, in accordance with some embodiments of the invention. The system 200 may include components and elements configured to support known or conventional operating features that need not be described in detail herein. In one exemplary embodiment, system 200 can be used to transmit and receive data symbols in a wireless communication environment such as the wireless communication environment 100 of FIG. 1, as described above.

System 200 generally includes a base station 202 (hereinafter "BS 202") and a user equipment device 204 (hereinafter "UE 204"). The BS 202 includes a BS (base station) transceiver module 210, a BS antenna 212, a BS processor module 214, a BS memory module 216, and a network communication module 218, each module being coupled and interconnected with one another as necessary via a date communication bus 220. The UE 204 includes a UE (user equipment) transceiver module 230, a UE antenna 232, a UE memory module 234, and a UE processor module 236, each module being coupled and interconnected with one another as necessary via a date communication bus 240. The BS 202 communicates with the UE 204 via a communication channel 250, which can be any wireless channel or other medium known in the art suitable for transmission of data as described herein.

As would be understood by persons of ordinary skill in the art, system 200 may further include any number of modules other than the modules shown in FIG. 2. Those skilled in the art will understand that the various illustrative blocks, modules, circuits, and processing logic described in connection with the embodiments disclosed herein may be implemented in hardware, computer-readable software, firmware, or any practical combination thereof. To clearly illustrate this interchangeability and compatibility of hardware, firmware, and software, various illustrative components, blocks, modules, circuits, and steps are described generally in terms of their functionality. Whether such functionality is implemented as hardware, firmware, or software depends upon the particular application and design constraints imposed on the overall system. Those familiar with the concepts described herein may implement such functionality in a suitable manner for each particular application, but such implementation decisions should not be interpreted as limiting the scope of the present invention.

In accordance with some embodiments, the UE transceiver 230 may be referred to herein as an "uplink" transceiver 230 that includes a RF transmitter and receiver circuitry that are each coupled to the antenna 232. A duplex switch (not shown) may alternatively couple the uplink transmitter or receiver to the uplink antenna in time duplex fashion. Similarly, in accordance with some embodiments, the BS transceiver 210 may be referred to herein as a "downlink" transceiver 210 that includes RF transmitter and receiver circuitry that are each coupled to the antenna 212. A downlink duplex switch may alternatively couple the downlink transmitter or receiver to the downlink antenna 212 in time duplex fashion. The operations of the two transceivers 210 and 230 are coordinated in time such that the uplink receiver is coupled to the uplink antenna 232 for reception of transmissions over the wireless transmission link 250 at the same time that the downlink transmitter is coupled to the downlink antenna 212. Preferably there is close time synchronization with only a minimal guard time between changes in duplex direction.

The UE transceiver 230 and the base station transceiver 210 are configured to communicate via the wireless data communication link 250, and cooperate with a suitably configured RF antenna arrangement 212/232 that can support a particular wireless communication protocol and modulation scheme. In some exemplary embodiments, the UE transceiver 608 and the base station transceiver 602 are configured to support industry standards such as the Long Term Evolution (LTE) and emerging 5G standards, and the like. It is understood, however, that the invention is not necessarily limited in application to a particular standard and associated protocols. Rather, the UE transceiver 230 and the base station transceiver 210 may be configured to support alternate, or additional, wireless data communication protocols, including future standards or variations thereof.

In accordance with various embodiments, the BS 202 may be an evolved node B (eNB), a serving eNB, a target eNB, a femto station, or a pico station, for example. In some embodiments, the UE 204 may be embodied in various types of user devices such as a mobile phone, a smart phone, a personal digital assistant (PDA), tablet, laptop computer, wearable computing device, etc. The processor modules 214 and 236 may be implemented, or realized, with a general purpose processor, a content addressable memory, a digital signal processor, an application specific integrated circuit, a field programmable gate array, any suitable programmable logic device, discrete gate or transistor logic, discrete hardware components, or any combination thereof, designed to perform the functions described herein. In this manner, a processor may be realized as a microprocessor, a controller, a microcontroller, a state machine, or the like. A processor may also be implemented as a combination of computing devices, e.g., a combination of a digital signal processor and a microprocessor, a plurality of microprocessors, one or more microprocessors in conjunction with a digital signal processor core, or any other such configuration.

Furthermore, the steps of a method or algorithm described in connection with the embodiments disclosed herein may be embodied directly in hardware, in firmware, in a software module executed by processor modules 214 and 236, respectively, or in any practical combination thereof. The memory modules 216 and 234 may be realized as RAM memory, flash memory, ROM memory, EPROM memory, EEPROM memory, registers, a hard disk, a removable disk, a CD-ROM, or any other form of storage medium known in the art. In this regard, memory modules 216 and 234 may be coupled to the processor modules 210 and 230, respectively, such that the processors modules 210 and 230 can read information from, and write information to, memory modules 216 and 234, respectively. The memory modules 216 and 234 may also be integrated into their respective processor modules 210 and 230. In some embodiments, the memory modules 216 and 234 may each include a cache memory for storing temporary variables or other intermediate information during execution of instructions to be executed by processor modules 210 and 230, respectively. Memory modules 216 and 234 may also each include non-volatile memory for storing instructions to be executed by the processor modules 210 and 230, respectively.

The network communication module 218 generally represents the hardware, software, firmware, processing logic, and/or other components of the base station 202 that enable bi-directional communication between base station transceiver 602 and other network components and communication nodes configured to communication with the base station 202. For example, network communication module 218 may be configured to support internet or WiMAX traffic. In a typical deployment, without limitation, network communication module 218 provides an 802.3 Ethernet interface such that base station transceiver 210 can communicate with a conventional Ethernet based computer network. In this manner, the network communication module 218 may include a physical interface for connection to the computer network (e.g., Mobile Switching Center (MSC)).

Referring again to FIG. 1, as discussed above, when the BS 102 is preparing to transmit and receive data from the UE 104, a scheduling process is typically performed before the BS actually transmits and receives the data from the UE 104. During such a scheduling process, control information such as DCI that includes resource block allocation information is typically transmitted from the BS 102 to the UE 104 via one or more physical channels, e.g., a PDCCH.

In some embodiments, a method for a BS to allocate one or more sequences of resource blocks for a UE using an RIV (resource indication value) is disclosed. First, in some embodiments, the BS may assign an identifier for each resource block of a sequence of resource blocks that is available for the UE to use. In some embodiments, such identifiers may be logically contiguous and can be correspond to either contiguous or noncontiguous resource blocks. Further, although some exemplary embodiments herein provided are directed to allocating resource blocks, it is noted that systems and methods in such exemplary embodiments can be used for allocating any of a variety of resources such as, for example, carrier wave resources (typically known as "carrier wave bandwidth"), time resources (e.g., frames), code resources, etc., while remaining within the scope of the present disclosure.

In an example where a sequence of resource block that the BS determines to allocate to the UE has a size of "N," resource blocks of such a sequence may be associated with respective identifiers such as, 0, 1, 2, 3, . . . , and up to N−1. In some embodiments, the BS may select a portion of such a sequence of resource blocks as a "sub" sequence of resource blocks to be allocated to the UE, and may present the sub sequence of resource blocks with a starting identifier "R" and a length (i.e., a total number of resource blocks) "x·G," or simply xG, wherein G is a positive integer larger than 1, and R and x are variables. Therefore, R and x satisfy the condition: xG+R≤N. Moreover, possible values of R and x are each contiguous. In other words, the sub sequence of resource blocks has a number of "xG" resource blocks and is started at an identifier "R," and since R and x are variables, plural sub sequence of resource blocks, each of which has respective starting identifier and number of resource blocks, may be determined by the BS. In some embodiments, after the BS determines such a sub sequence of resource blocks, the BS determines a corresponding RIV indicating the sub sequence of resource blocks.

In some embodiments, a respective RIV can be determined based on the following set of conditional equations (1):

$$\text{if } x \text{ satisfies: } x \leq \left\lceil \frac{N - N \bmod G}{2G} \right\rceil, \text{ or } x \leq \left\lceil \frac{\lfloor N/G \rfloor}{2} \right\rceil, \quad (1)$$
$$\text{or } x \leq \left\lfloor \frac{\lfloor N/G \rfloor + 1}{2} \right\rfloor, \text{ or } x \leq \frac{\lfloor N/G \rfloor + 1}{2}$$
$$\text{then}$$
$$RIV = (N - G + 2 + N \bmod G)(x - 1) + R$$
$$\text{else}$$
$$RIV =$$
$$(N - G + 2 + N \bmod G)\left(\left\lfloor \frac{N}{G} \right\rfloor - x\right) + (N - G + 1 + N \bmod G - R))$$

In some cases, when N can be divided evenly by G, the RIV can be determined based on the following set of conditional equations (2):

$$\text{if } x \text{ satisfies: } x \leq \left\lceil \frac{N}{2G} \right\rceil, \text{ or } x \leq \left\lceil \frac{N/G + 1}{2} \right\rceil, \text{ or } x \leq \frac{N/G + 1}{2} \quad (2)$$
$$\text{then}$$
$$RIV = (N - G + 2)(x - 1) + R$$
$$\text{else}$$
$$RIV = (N - G + 2)\left(\frac{N}{G} - x\right) + (N - G + 1 - R))$$

Since x and R are variables as mentioned above, the RIV may have plural possible values. In some embodiments, "K" in equation (3) as shown below is used to determine a number of bits to accommodate all the possible values of the RIV.

$$K = \lceil \log_2 M \rceil, \text{ wherein } M = \left\lfloor \frac{N}{G} \right\rfloor\left(N + 1 - G\left(\left\lfloor \frac{N}{G} \right\rfloor + 1\right)/2\right) \quad (3)$$

Figure 3:
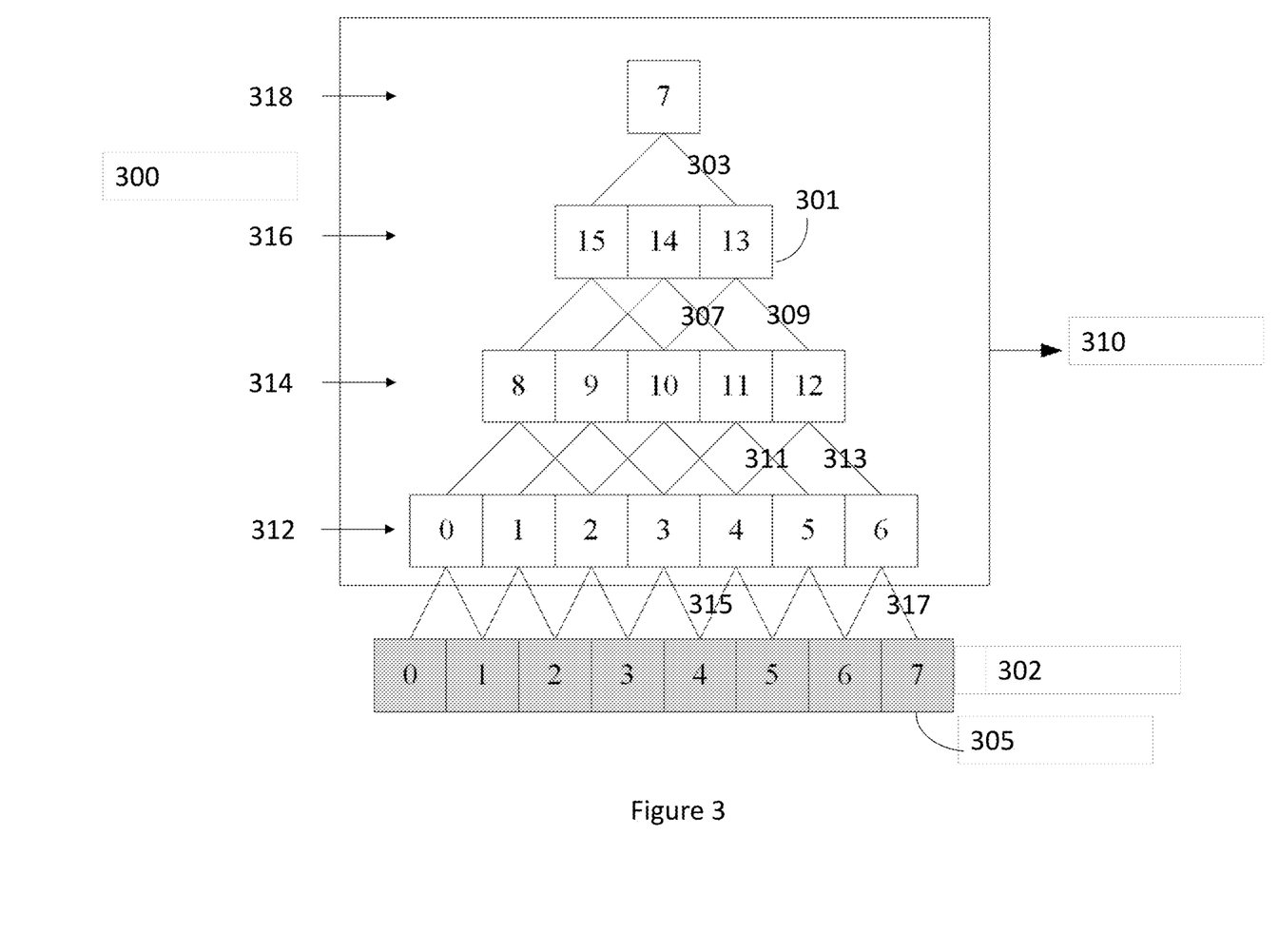
FIG. 3 illustrates an exemplary tree diagram showing a relationship between a sequence of resource blocks and all possible values of RIV determined by a set of conditional equations, in accordance with some embodiments of the present disclosure.

FIG. 3 illustrates a symbolic relationship between a sequence of resource blocks and all possible values of RIV that are determined by the set of conditional equations (1) or (2), in accordance with some embodiments. As shown, such a symbolic relationship may be present as a tree diagram 300 with a plurality of nodes 301, branches 303, and outcome nodes 305. In some embodiments, each node (e.g., 301) corresponds to a derived RIV (based on either the set of equations (1) or (2)), and each outcome node (e.g., 305) corresponds to an identifier of a sequence of resource blocks that is available to be allocated. More specifically, each node (i.e., each RIV) is coupled to two "boundary" outcome nodes (i.e., two identifiers) through respective branches, which may be used to define a corresponding sub sequence of resource blocks. Details of the tree diagrams of FIG. 3 will be discussed in further detail below.

In the illustrated embodiment of FIG. 3, when a sequence of resource blocks 302 (hereinafter "sequence 302") with a size of 8 (i.e., N=8) is provided, and G is predefined as 2, the tree diagram 300 can be provided based on the set of equations (1) or (2). More specifically, based on the above discussion, each of the resource blocks of the sequence 302 is assigned an identifier: 0, 1, 2, 3, 4, 5, 6, and 7 as shown, and each resource block is disposed at an outcome node (e.g., 305) of the tree diagram 300. Based on equation (3), there are a total number of 16 possible values of RIV. As shown, those 16 values of RIV, each corresponds to a node (e.g., 301), are included in an RIV box 310, and the RIV box 310 includes four tiers 312, 314, 316, and 318. Tier 312 includes values of RIV=0, 1, 2, 3, 4, 5, and 6; tier 314 includes values of RIV=8, 9, 10, 11, and 12; tier 316 includes values of RIV=15, 14, and 13 (node 301); and tier 318 includes an value of RIV=7. Each tier corresponds to an "x" value. For example, tier 312 corresponds to x=1, tier 314 corresponds to x=2; tier 316 corresponds to x=3; and tier 318 corresponds to x=4. In some embodiments, except for the node (e.g., RIV=7) at the top tier and the node (e.g., RIV=0, 1, 2, 3, 4, 5, or 6) at the bottom tier, each node is coupled to two nodes at a next lower tier through two respective branches, and to a node at a next upper tier through a respective branch. For example, node 301 (RIV=13) at tier 316 is coupled to a node (RIV=7) at its next upper tier 318 via branch 303, and to two nodes (RIV=10 and RIV=12) at its next lower tier 314 via branches 307 and 309, respectively. Moreover, each of the nodes at the bottom tier is coupled to two identifiers of the sequence 302.

Further, using the set of equations (1) or (2), the following equations can be derived:

if $x \leq 2$, then RIV=8(x−1)+R, else RIV=8(4−x)+(7−R)

In some embodiments, the tree diagram 300 of FIG. 3 is associated with the above equations. In an example, when the BS determines to allocate a sub sequence of resource blocks to the UE with a length of 4 (i.e., x=2 since x=length/G) and starting at the identifier 4 (i.e., R=4), the RIV is equal to 12 (because x is equal to 2 and then RIV=8(2−1)+4=12). As shown in FIG. 3, the node of RIV=12 at tier 314 is coupled to nodes of RIV=4 and RIV=6 at tier 312 via branches 311 and 313, respectively. Further, the node of RIV=4 is coupled to identifiers of 4 (via branch 315) and 5, and the node of RIV=6 is coupled to identifiers of 6 and 7 (via branch 317). As such, a "boundary" of identifiers (e.g., from identifiers 4 to 7) may be defined by a node's (i.e., an RIV) two respective outermost branches coupled between the bottom tier 312 and the identifiers of the sequence 302, e.g., branches 315 and 317. In some embodiments, such a boundary of identifiers is consistent with the sub sequence of resource blocks that the BS determine to allocate. Alternatively stated, when the BS determines a sub sequence of resource blocks with R=4 and x=2 (starting at identifier 4 and with a length of 4), identifiers 4, 5, 6, and 7 are selected, which is consistent with the identifiers enclosed by the boundary.

In some alternative embodiments, each of the variables R and x in the set of equations (1) has a respective range of values but still satisfy the condition: $xG+R \leq N$. For R, its respective range has a minimum value $R_{min}$; and for x, its respective range has a minimum value $x_{min}$ and a maximum value $x_{max}$. As such, the set of equations (1) to derive the RIV may be represented as the set of equations (4), which are shown below.

$$\text{if } x \text{ satisfies: } x \leq \left\lfloor \frac{x_{min} + x_{max}}{2} \right\rfloor \text{ or } x \leq \frac{x_{min} + x_{max}}{2} \quad (4)$$

then $$RIV = W(x - x_{min}) + R - R_{min}$$

else $$RIV = W(x_{max} - x) + W - 1 - (R - R_{min}),$$

$$\text{wherein } W = 2N - (x_{min} + x_{max})G + 2 - 2R_{min}$$

The set of equations (4) may be alternatively expressed as the set of equations (5), as shown below.

$$RIV = \min(RIV_1, RIV_2) \quad (5)$$

$$RIV_1 = W(x - x_{min}) + y - y_{min}$$

$$RIV_2 = W(x_{max} - x) + W - 1 - (y - y_{min})$$

In some embodiments, when x and G further satisfy the condition: $xGP + RP \leq N$ (P is a positive integer larger than 1), the set of equations (4) to derive the RIV may be represented as the set of equations (6), which are shown below.

$$\text{if } x \text{ satisfies: } x \leq \left\lfloor \frac{x_{min} + x_{max}}{2} \right\rfloor \text{ or } x \leq \frac{x_{min} + x_{max}}{2} \quad (6)$$

then $$RIV = W(x - x_{min}) + R - R_{min}$$

else $$RIV = W(x_{max} - x) + W - 1 - (R - R_{min}),$$

$$\text{wherein } W = 2\frac{N}{P} - (x_{min} + x_{max})G + 2 - 2R_{min}$$

In some embodiments, when a tree diagram, based on the set of equations (1) to (6), is provided. Patterns of a total number of nodes disposed at two respective tiers and a sequence of respective values of RIV along those two respective tiers may be respectively formed. More specifically, the first pattern may include that a total number of nodes at two respective tiers that correspond to $x=x_{min}+i$ and $x=x_{max}-i$ (i is an integer between 0 and $x_{max}-x_{min}$), respectively, is a constant value, and the constant value is the "W" in the sets of equations (4)-(6). The second pattern may include that respective RIVs at the nodes of such two tiers are contiguous. Using the tree diagram 300 of FIG. 3 as an example, at tiers 312 (x=1+0) and 318 (x=4−0), there are a total number of 8 (W=2×8−(0+4)2+2−2) nodes, and at tiers 314 (x=1+1) and 316 (x=4−1), there are also a total number of 8 nodes, which corresponds to the first pattern mentioned above. And the RIVs at the nodes of tier 312 and 318 are 0, 1, 2, 3, 4, 5, 6, and 7, and the RIVs at the nodes of tier 314 and 316 are 8, 9, 10, 11, 12, 13, 14, and 15, which corresponds to the second pattern mentioned above.

Such patterns may be expressed using the following equations. When Gx and R are respectively represented as y and z, possible values of z are contiguous, possible values of y are non-contiguous, possible values of y are $Y(1)$, $Y(2) \ldots Y(V)$ that satisfy a condition of $Y(1) < Y(2) < \ldots < Y(V)$, V is an predefined integer, and $V \geq 1$, a sum of numbers of the resource indication values that correspond to $y=Y(i+1)$ and $y=Y(V-i)$ is a constant and respective possible values of the resource indication value are contiguous, wherein $0 \leq i \leq V-1$. In some embodiments, the possible values of y form an arithmetic progression.

In some embodiments, the RIV can be determined based on another set of conditional equations (7):

$$\text{if } x = 1, \quad (7)$$

then $RIV = R$ else if $x - 1 \leq \left\lfloor \frac{N}{2G} \right\rfloor$ or $x - 1 \leq \frac{N}{2G}$ then $$RIV = (N - 2G + 2 + N \bmod G)(x - 1) + G - 1 - N \bmod G + R$$

else $$RIV = (N - 2G + 2 + N \bmod G)\left(\left\lfloor \frac{N}{G} \right\rfloor - x + 1\right) + (N - 2G + 1 + N \bmod G - R)) + G - 1 - N \bmod G$$

In some cases, when N can be divided evenly by G, the RIV can be determined based on the following set of conditional equations (8):

$$\text{if } x = 1, \quad (8)$$

then $RIV = R$ else if $x - 1 \leq \left\lfloor \frac{N}{2G} \right\rfloor$ or $x - 1 \leq \frac{N}{2G}$ then $$RIV = (N - 2G + 2)(x - 1) + G - 1 + R$$

else $$RIV = (N - 2G + 2)\left(\frac{N}{G} - x + 1\right) + (N - 2G + 1 - R)) + G - 1$$

Similarly, since x and R are variables as mentioned above, the RIV may have plural possible values. In some embodiments, "K" in equation (9) as shown below is used to determine a number of bits to accommodate all the possible values of the RIV.

$$K = \lceil \log_2 M \rceil, \text{ wherein } M = \left\lfloor \frac{N}{G} \right\rfloor \left(N + 1 - G\left(\left\lfloor \frac{N}{G} \right\rfloor + 1\right)/2\right) \quad (9)$$

Figure 4:
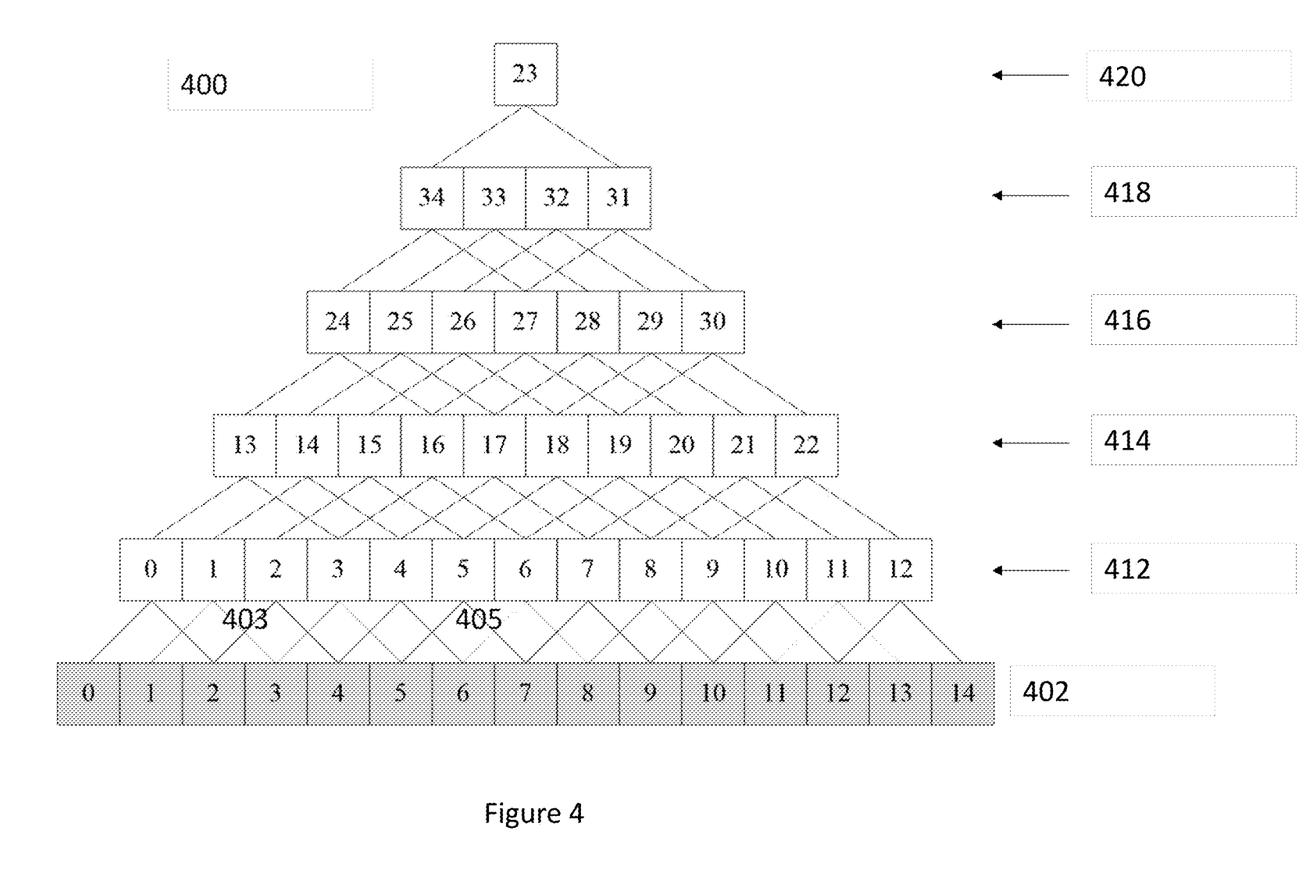
FIG. 4 illustrates another exemplary tree diagram showing a relationship between a sequence of resource blocks and all possible values of RIV determined by another set of conditional equations, in accordance with some embodiments of the present disclosure.

FIG. 4 illustrates a symbolic relationship between a sequence of resource blocks and all possible values of RIV that are determined by the set of conditional equations (7) or (8), in accordance with some embodiments. As shown, such a symbolic relationship may be present as a tree diagram 400 with a plurality of nodes, branches, and outcome nodes, which is substantially similar to the tree diagram 300 (FIG.

3) except for the distribution of RIV at respective nodes due to the use of a different set of conditional equations. Thus, discussion of the tree diagram 400 is not repeated here.

In an example where N=15 and G=3, a sequence of resource blocks 402 (hereinafter "sequence 402"), each of which is associated with a respective identifier, is provided. Using the set of equations (7) or (8), the following equations can be derived:

if $x=1$, then RIV=R else if $x \leq 3$, then RIV=11($x$−1)+2+R else RIV=11(6−$x$)+(10−R)+2

Continuing with the same example, when the BS determines to allocate a sub sequence of resource blocks to the UE with a length of 6 (i.e., $x=2$ since $x=$length/G) and starting at the identifier 2 (i.e., R=2), the RIV is equal to 15 (because $x$ is equal to 2 ($x \leq 3$) and then RIV=11 (2−1)+2+2=15). As shown in FIG. 4, the node of RIV=15 at tier 414 is coupled to nodes of RIV=2 and RIV=5 at its next lower tier 412. Further, the node of RIV=2 is coupled to identifiers of 2 and 4, and the node of RIV=5 is coupled to identifiers of 5 and 7. As such, a "boundary" of identifiers (e.g., from identifiers 2 to 7) may be defined by the node's (RIV=15) two respective outermost branches (e.g., 403 and 405) coupled between bottom tier 412 of the tree diagram 400 and the identifiers of the sequence 402. As described above, in some embodiments, such a boundary of identifiers is consistent with the sub sequence of resource blocks that the BS determine to allocate. Alternatively stated, when the BS determines a sub sequence of resource blocks with R=2 and $x=2$ (starting at identifier 2 and with a length of 6), identifiers 2, 3, 4, 5, 6, and 7 are selected, which is consistent with the identifiers enclosed by the boundary.

In some alternative embodiments, the set of equations (7) may be expressed as the set of equations (10), as shown below.

$$\text{if } x - 1 \leq \left\lfloor \frac{N}{2G} \right\rfloor \text{ or } x - 1 \leq \frac{N}{2G} \quad (10)$$

then $$RIV = (N - G + 1)(x - 1) + R$$

else $$RIV = (N - G + 1)\left(\left\lfloor \frac{N}{G} \right\rfloor - x + 1\right) + (N - G - R),$$

wherein $G$ and $N$ selectively satisfy: $G - 1 - N \mod G = 0$

In some alternative embodiments, each of the variables R and $x$ in the set of equations (8) or (10) has a respective range of values but still satisfy the condition: $xG+R \leq N$. For R, its respective range has a minimum value $R_{min}$; and for $x$, its respective range has a minimum value $x_{min}$ and a maximum value $x_{max}$. As such, the set of equations (8)/(10) to derive the RIV may be represented as the set of equations (11) or (12), which are shown below, respectively.

if $x = x_{min}$ (11)

then $$RIV = R - R_{min}$$

else if $x$ satisfies $$x - 1 \leq \left\lfloor \frac{x_{min} + x_{max}}{2} \right\rfloor \text{ or } x - 1 \leq \frac{x_{min} + x_{max}}{2}$$

then $$RIV = W(x - x_{min}) + G - 1 - N \mod G + R - R_{min}$$

else $$RIV = W(x_{max} - x + 1) + W - 1 - (R - R_{min}) + G - 1 - N \mod G,$$

wherein $W = 2N - (x_{min} + x_{max} + 1)G + 2 - 2R_{min}$ if $x$ satisfies $x - 1 \leq \left\lfloor \frac{x_{min} + x_{max}}{2} \right\rfloor$ or $x - 1 \leq \frac{x_{min} + x_{max}}{2}$ (12)

then $$RIV = W(x - x_{min}) + G - 1 - N \mod G + R - R_{min}$$

else $$RIV = W(x_{max} - x + 1) + W - 1 - (R - R_{min}) + G - 1 - N \mod G,$$

wherein $W = 2N - (x_{min} + x_{max} + 1)G + 2 - 2R_{min}$, and $G$ and $N$ selectively satisfy: $G - 1 - N \mod G = 0$ In some embodiments, when $x$ and G further satisfy the condition: $xGP+RP \leq N$ (P is a positive integer larger than 1), the set of equations (11) and (12) to derive the RIV may be represented as the set of equations (13) and (14), respectively, which are shown below.

if $x = x_{min}$ (13)

then $$RIV = R - R_{min}$$

else if $x$ satisfies $$x - 1 \leq \left\lfloor \frac{x_{min} + x_{max}}{2} \right\rfloor \text{ or } x - 1 \leq \frac{x_{min} + x_{max}}{2}$$

then $$RIV = W(x - x_{min}) + G - 1 - \frac{N}{P} \mod G + R - R_{min}$$

else $$RIV = W(x_{max} - x + 1) + W - 1 - (R - R_{min}) + G - 1 - \frac{N}{P} \mod G,$$

wherein $W = 2\frac{N}{P} - (x_{min} + x_{max} + 1)G + 2 - 2R_{min}$ if $x$ satisfies $x - 1 \leq \left\lfloor \frac{x_{min} + x_{max}}{2} \right\rfloor$ or $x - 1 \leq \frac{x_{min} + x_{max}}{2}$ (14)

then $$RIV = W(x - x_{min}) + G - 1 - \frac{N}{P} \mod G + R - R_{min}$$

else $$RIV = W(x_{max} - x + 1) + W - 1 - (R - R_{min}) + G - 1 - \frac{N}{P} \mod G,$$

-continued wherein $W = 2N - (x_{min} + x_{max} + 1)G + 2 - 2R_{min}$, and $G$ and $\frac{N}{P}$ selectively satisfy: $G - 1 - \frac{N}{P} \mod G = 0$ In some embodiments, when a tree diagram, based on the set of equations (7) to (14), is provided. Patterns of a total number of nodes disposed at two respective tiers and a sequence of respective values of RIV along those two respective tiers may be respectively formed. More specifically, the first pattern may include that a total number of nodes at two respective tiers that correspond to $x=x_{min}+i$ and $x=x_{max}+1-i$ (i is an integer between 1 and $x_{max}-x_{min}$), respectively, is a constant value, and the constant value is the "W" in the sets of equations (7)-(14). The second pattern may include that respective RIVs at the nodes of such two tiers are contiguous. Using the tree diagram 400 of FIG. 4 as an example, at tiers 414 (corresponding to x=1+1) and 420 (corresponding to x=5+1-1), there are a total number of 11 nodes, and at tiers 416 (corresponding to x=1+2) and 418 (corresponding to x=5+1-2), there are also a total number of 11 nodes, which corresponds to the first pattern mentioned above. And the RIVs at the nodes of tier 414 and 420 are 13, 14, 15, 16, 17, 18, 19, 20, 21, 22, and 23, and the RIVs at the nodes of tier 416 and 418 are 24, 25, 26, 27, 28, 29, 30, 31, 32, 33, and 34, which corresponds to the second pattern mentioned above.

Such patterns may be expressed using the following equations. When Gx and R are respectively represented as y and z, possible values of z are contiguous, possible values of y are non-contiguous, possible values of y are Y(1), Y(2) ... Y(V) that satisfy a condition of Y(1)<Y(2)<...<Y(V), V is an predefined integer, and V≥1, a sum of numbers of the resource indication values that correspond to y=Y(i+1) and Y=Y(V+1-i) is a constant and respective possible values of the resource indication value are contiguous, wherein 1≤i≤V-1. In some embodiments, the possible values of y form an arithmetic progression.

In some other embodiments, the BS may select a sub sequence of resource blocks from a sequence of resource blocks (e.g., the sequence of resource blocks with the size of N. The resource blocks of such a sequence may be associated with respective identifiers such as 1, 2, 3, ..., and up to N.) to be allocated to the UE using a starting identifier "s" and an ending identifier "X(U)," wherein U is a predefined positive integer. As such, X(U) may include: X(1), X(2), X(3) ... and up to X(U), and X(1)<X(2)<X(3) ... <X(U). In other words, the sub sequence of resource blocks has a number of resource blocks that is defined (e.g., enclosed) by the starting identifier s and ending identifier X(u), wherein "u" is an integer selected from one of 1 to U and s is a variable. Possible values of s are contiguous and are 1, 2, 3, ..., and N. In some embodiments, after the BS determines such a sub sequence of resource blocks, the BS determines a corresponding RIV indicating the sub sequence of resource blocks.

In some embodiments, a respective RIV can be determined based on the following equation (15):

$$RIV = \sum_{i=1}^{u} X(i) - s \tag{15}$$

In some embodiments, when the number of sub sequence of resource blocks is limited to be not smaller than a positive integer "L" that is not less than 1, the RIV can be determined based on the following equation (16):

$$RIV = \sum_{i=1}^{u}(X(i)-L+1)-s \tag{16}$$

As such, bits "K" used to accommodate all possible values of RIV may be determined by the following equation (17):

$$K=\lceil \log_2 M \rceil, \text{ wherein } M=\sum_{i=1}^{u}X(i)-U(L-1)-s \tag{17}$$

In some embodiments, when a minimum number of sub sequence of resource blocks is limited to be "L," and $$X(i) = iL \left(i = 1, 2, \ldots \left\lfloor \frac{N}{L} \right\rfloor\right),$$

the RIV can be determined based on the following equation (18):

$$RIV = \frac{u(u-1)L}{2} + u - s \tag{18}$$

As such, bits "K" used to accommodate all possible values of RIV may be determined by the following equation (19):

$$K = \lceil \log_2 M \rceil, \text{ wherein } M = \frac{U(U-1)L}{2} + U \tag{19}$$

In some embodiments, when the plurality of X(i) form an arithmetic progression (i.e., X(i+1)-X(i)=P, wherein P is a constant), the RIV can be determined based on the following equation (20):

$$RIV = \frac{u(u-1)P}{2} + u(X(1)-L+1)-s \tag{20}$$

Alternatively, the RIV derived by equation (20) may be expressed as a set of conditional equations (21) as shown below.

$$\text{if } u \leq \left\lfloor \frac{1+U}{2} \right\rfloor \tag{21}$$

$$RIV = W(u-1)+s-1$$

else $$RIV = W(U-u)+W-s,$$

wherein $W = X(1) + X(U) - 2L + 2$

Similarly, in some other embodiments, the BS may select a sub sequence of resource blocks from a sequence of resource blocks (e.g., the sequence of resource blocks with the size of N discussed above) to be allocated to the UE using a starting identifier "X(U)" and an ending identifier "s," wherein U is a predefined positive integer. As such, X(U) may include: X(1), X(2), X(3) ... and up to X(U), and X(1)<X(2)<X(3) ... <X(U). In other words, the sub sequence of resource blocks has a number of resource blocks that is defined (e.g., enclosed) by the starting identifier X(u) and ending identifier s, wherein "u" is an integer selected from one of 1 to U. In some embodiments, after the BS determines such a sub sequence of resource blocks, the BS determines a corresponding RIV indicating the sub sequence of resource blocks.

In some embodiments, a respective RIV can be determined based on the following equation (22):

$$RIV = \sum_{i=1}^{u} (N - X(U-i+1)+1) - u(L-1) - N + s - 1, \text{ wherein}$$
$$i = 1, 2, \ldots U \quad (22)$$

One bit may be used to indicate the RIV is calculated by (16) or (22).

Figure 5:
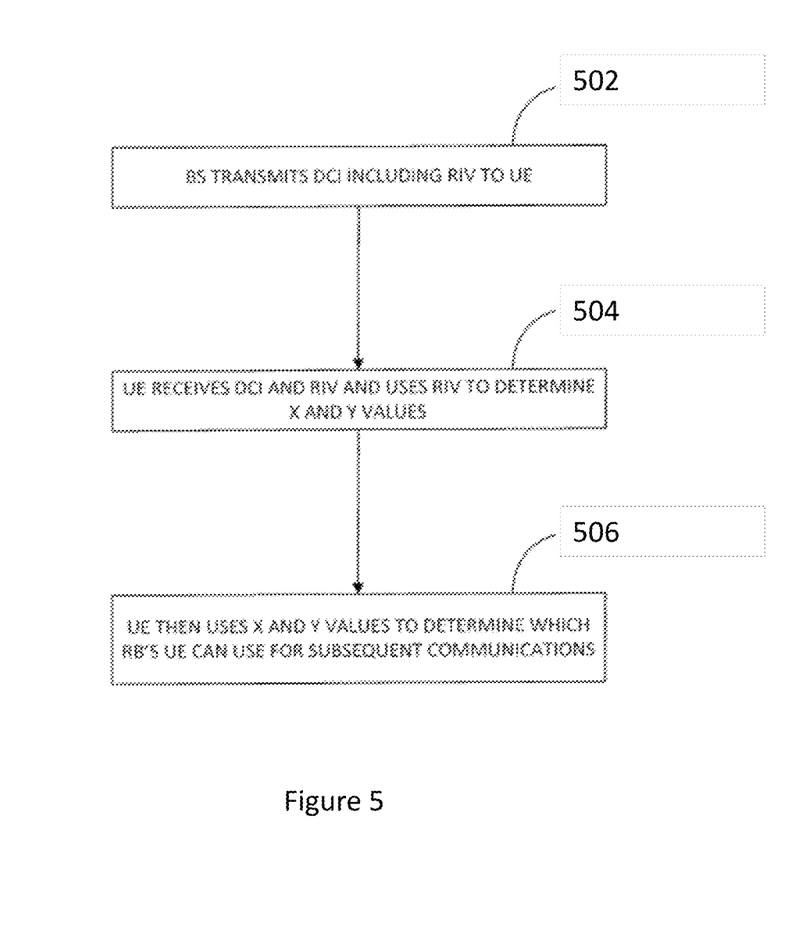
FIG. 5 illustrates a flowchart of a method of allocating resource blocks to a UE device, in accordance with some embodiments of the present disclosure.

FIG. 5 illustrates a flowchart of a method 500 of allocating resource blocks to a UE device (e.g., a UE), in accordance with some embodiments. The method 500 starts at operation 502, in which a BS transmits control information (DCI) to UE through PDCCH. Such DCI includes one of the above-described methods to allocate the resource blocks. In other words, whenever a signal containing the DCI is transmitted to a UE, such a signal includes an RIV value, which corresponds to a pair of (R, x) or (X(u), s) as described above. Next, at operation 504, the UE receives the DCI and RIV and uses the RIV value contained in the signal to determine R and x values, or X(u) and s values, using the same equations used by the BS to calculate the RIV value. At operation 506, the UE then can use the R and x values, or X(u) and s values, to determine which resource blocks (which sub sequence of resource blocks) the UE can use for subsequent communications with the BS.

In an embodiment, if the BS uses the set of equations (1) above to determine a RIV value and transmit a signal containing the RIV value and DCI, the UE can estimate (R, x) by performing the following steps:

Step 1: Determine values of "$a$" and "$b$,"

wherein $a = \left\lfloor \dfrac{RIV}{N - G + 2 + N \bmod G} \right\rfloor + 1,$ and $b = RIV \bmod (N - G + 2 + N \bmod G)$ Step 2: If $(a + b) > (N - G + 1 + N \bmod G)$, then $x = \left\lfloor \dfrac{N}{G} \right\rfloor + 1 - a$, and $R = N - G + 1 + N \bmod G - b$ Step 3: Else (i.e., $(a + b) \leq (N - G + 1 + N \bmod G)$), then $x = a$, and $R = b$.

In another embodiment, if the BS uses the set of equations (2) above to determine a RIV value and transmit a signal containing the RIV value and DCI, the BS can estimate (R, x) by performing the following steps:

Step 1: Determine values of "$a$" and "$b$,"

wherein $a = \left\lfloor \dfrac{RIV}{N - G + 2} \right\rfloor + 1,$ and $b = RIV \bmod (N - G + 2)$ Step 2: If $(a + b) > (N - G + 1)$, then $x = \dfrac{N}{G} + 1 - a$, and $R = N - G + 1 - b$ Step 3: Else (i.e., $(a + b) \leq (N - G + 1)$), then $x = a$, and $R = b$.

In a further embodiment, if the BS uses the set of equations (7) above to determine a RIV value and transmit the signal containing the RIV and DCI, the BS can estimate (R, x) by by performing the following steps:

Step 1: If $RIV \leq N - G$, then $x = 1$, and $R = RIV$

Step 2: If $RIV > N - G$, then determine values of "$a$" and "$b$,"

wherein $a = \left\lfloor \dfrac{RIV - G + 1 + N \bmod G}{N - G + 2 + N \bmod G} \right\rfloor + 1,$ and $b = (RIV - G + 1 + N \bmod G) \bmod$ $(N - 2G + 2 + N \bmod G)$ Step 3: If $(a + b) > (N - 2G + N \bmod G)$, then $x = \left\lfloor \dfrac{N}{G} \right\rfloor + 2 - a$, and $R = N - 2G + 2 + N \bmod G$ Step 4: Else (i.e., $(a + b) \leq (N - 2G + N \bmod G)$), then $x = a$, and $R = b$.

In a further embodiment, if the BS uses the set of equation (8) above to determine a RIV value and transmit the signal containing the RIV and DCI, the BS can estimate (R, x) by performing the following steps:

Step 1: If $RIV \leq N - G$, then $x = 1$, and $R = RIV$

Step 2: If $RIV > N - G$, then determine values of "$a$" and "$b$,"

wherein $a = \left\lfloor \dfrac{RIV - G + 1}{N - 2G + 2} \right\rfloor + 1,$ and $b = (RIV - G + 1) \bmod (N - 2G + 2)$ Step 3: If $(a + b) > (N - 2G)$, then $x = \left\lfloor \dfrac{N}{G} \right\rfloor + 2 - a$, and $R = N - 2G + 1 - b$ Step 4: Else (i.e., $(a + b) \leq (N - 2G)$), then $x = a$, and $R = b$.

In a further embodiment, if the BS uses the set of equation (10) above to determine a RIV value and transmit the signal containing the RIV and DCI, the BS can estimate (R, x) by performing the following steps:

Step 1: Determine values of "$a$" and "$b$,"

wherein $a = \left\lfloor \dfrac{RIV}{N - G + 1} \right\rfloor + 1,$ and $b = RIV \bmod (N - G + 1)$ Step 2: If $(a + b) > (N - G + 1)$, then $x = \left\lfloor \dfrac{N}{G} \right\rfloor + 2 - a$, and $R = N - G - b$ Step 4: Else (i.e., $(a + b) \leq (N - G + 1)$), then $x = a$, and $R = b$.

While various embodiments of the invention have been described above, it should be understood that they have been presented by way of example only, and not by way of limitation. Likewise, the various diagrams may depict an example architectural or configuration, which are provided to enable persons of ordinary skill in the art to understand exemplary features and functions of the invention. Such persons would understand, however, that the invention is not restricted to the illustrated example architectures or configurations, but can be implemented using a variety of alternative architectures and configurations. Additionally, as would be understood by persons of ordinary skill in the art, one or more features of one embodiment can be combined with one or more features of another embodiment described herein. Thus, the breadth and scope of the present disclosure should not be limited by any of the above-described exemplary embodiments.

It is also understood that any reference to an element herein using a designation such as "first," "second," and so forth does not generally limit the quantity or order of those elements. Rather, these designations can be used herein as a convenient means of distinguishing between two or more elements or instances of an element. Thus, a reference to first and second elements does not mean that only two elements can be employed, or that the first element must precede the second element in some manner.

Additionally, a person having ordinary skill in the art would understand that information and signals can be represented using any of a variety of different technologies and techniques. For example, data, instructions, commands, information, signals, bits and symbols, for example, which may be referenced in the above description can be represented by voltages, currents, electromagnetic waves, magnetic fields or particles, optical fields or particles, or any combination thereof.

A person of ordinary skill in the art would further appreciate that any of the various illustrative logical blocks, modules, processors, means, circuits, methods and functions described in connection with the aspects disclosed herein can be implemented by electronic hardware (e.g., a digital implementation, an analog implementation, or a combination of the two), firmware, various forms of program or design code incorporating instructions (which can be referred to herein, for convenience, as "software" or a "software module), or any combination of these techniques. To clearly illustrate this interchangeability of hardware, firmware and software, various illustrative components, blocks, modules, circuits, and steps have been described above generally in terms of their functionality. Whether such functionality is implemented as hardware, firmware or software, or a combination of these techniques, depends upon the particular application and design constraints imposed on the overall system. Skilled artisans can implement the described functionality in various ways for each particular application, but such implementation decisions do not cause a departure from the scope of the present disclosure.

Furthermore, a person of ordinary skill in the art would understand that various illustrative logical blocks, modules, devices, components and circuits described herein can be implemented within or performed by an integrated circuit (IC) that can include a general purpose processor, a digital signal processor (DSP), an application specific integrated circuit (ASIC), a field programmable gate array (FPGA) or other programmable logic device, or any combination thereof. The logical blocks, modules, and circuits can further include antennas and/or transceivers to communicate with various components within the network or within the device. A general purpose processor can be a microprocessor, but in the alternative, the processor can be any conventional processor, controller, or state machine. A processor can also be implemented as a combination of computing devices, e.g., a combination of a DSP and a microprocessor, a plurality of microprocessors, one or more microprocessors in conjunction with a DSP core, or any other suitable configuration to perform the functions described herein.

If implemented in software, the functions can be stored as one or more instructions or code on a computer-readable medium. Thus, the steps of a method or algorithm disclosed herein can be implemented as software stored on a computer-readable medium. Computer-readable media includes both computer storage media and communication media including any medium that can be enabled to transfer a computer program or code from one place to another. A storage media can be any available media that can be accessed by a computer. By way of example, and not limitation, such computer-readable media can include RAM, ROM, EEPROM, CD-ROM or other optical disk storage, magnetic disk storage or other magnetic storage devices, or any other medium that can be used to store desired program code in the form of instructions or data structures and that can be accessed by a computer.

In this document, the term "module" as used herein, refers to software, firmware, hardware, and any combination of these elements for performing the associated functions described herein. Additionally, for purpose of discussion, the various modules are described as discrete modules; however, as would be apparent to one of ordinary skill in the art, two or more modules may be combined to form a single module that performs the associated functions according embodiments of the invention.

Additionally, memory or other storage, as well as communication components, may be employed in embodiments of the invention. It will be appreciated that, for clarity purposes, the above description has described embodiments of the invention with reference to different functional units and processors. However, it will be apparent that any suitable distribution of functionality between different functional units, processing logic elements or domains may be used without detracting from the invention. For example, functionality illustrated to be performed by separate processing logic elements, or controllers, may be performed by the same processing logic element, or controller. Hence, references to specific functional units are only references to a suitable means for providing the described functionality, rather than indicative of a strict logical or physical structure or organization.

Various modifications to the implementations described in this disclosure will be readily apparent to those skilled in the art, and the general principles defined herein can be applied to other implementations without departing from the scope of this disclosure. Thus, the disclosure is not intended to be limited to the implementations shown herein, but is to be accorded the widest scope consistent with the novel features and principles disclosed herein, as recited in the claims below.

What is claimed is:
1. A method, comprising:
determining a resource indication value (RIV) as a function of at least two of a first parameter, a second parameter, and a third parameter, the resource indication value indicative of respective identifiers of a sequence of resource blocks to be allocated to a communication node, wherein a number of bits $K=\log_2 \lfloor N/G \rfloor (N+1-G(\lfloor N/G \rfloor+1)/2)$ indicates possible resource indication values generated by the function with N representing a maximum number of available resource blocks that can be allocated to the communication node and G representing a predefined positive integer larger than 1; and
transmitting the resource indication value to the communication node.

2. The method of claim 1, wherein when the function is of the first and second parameters, and the first parameter indicates a starting identifier and the second parameter indicates a length of the sequence of resource blocks, respectively, the function is selected from one of $$RIV = (N - G + 2 + N \bmod G)(x - 1) + R,$$

$$RIV = (N - G + 2 + N \bmod G)\left(\left\lfloor \frac{N}{G} \right\rfloor - x\right) +$$

$$(N - G + 1 + N \bmod G - R)),$$

$W(x - x_{min}) + R - R_{min}$ or $RIV = W(x_{max} - x) + W - 1 - (R - R_{min})$, wherein R represents the first parameter, x represents the second parameter, $x_{min}$ and $x_{max}$ respectively represent a minimum value and a maximum value of x, $R_{min}$ represents a minimum value of R, and $W=2N-(x_{min}+x_{max})G+2-2R_{min}$.

3. The method of claim 2, wherein if $$x \leq \left\lceil \frac{N - N \bmod G}{2G} \right\rceil, \text{ or } x \leq \left\lceil \frac{\lfloor N/G \rfloor}{2} \right\rceil, \text{ or } x \leq \left\lfloor \frac{\lfloor N/G \rfloor + 1}{2} \right\rfloor,$$

the function is $RIV=(N-G+2+N \bmod G)(x-1)+R$, otherwise, the function is $$RIV = (N - G + 2 + N \bmod G)\left(\left\lfloor \frac{N}{G} \right\rfloor - x\right) +$$

$$(N - G + 1 + N \bmod G - R)),$$

or if x satisfies:

$$x \leq \left\lfloor \frac{x_{min} + x_{max}}{2} \right\rfloor,$$

the function is $RIV=W(x-x_{min})+R-R_{min}$, otherwise, the function is $RIV=W(x_{max}-x)+W-1-(R-R_{min})$.

4. The method of claim 1, wherein when the function is of the first and second parameters, and the first parameter indicates a starting identifier and the second parameter indicates a length of the sequence of resource blocks, respectively, the function is selected from one of:

$$RIV = R, RIV =$$

$$(N - 2G + 2 + N \bmod G)(x - 1) + G - 1 - N \bmod G + R,$$

$$RIV = (N - 2G + 2 + N \bmod G)\left(\left\lfloor \frac{N}{G} \right\rfloor - x + 1\right) +$$

$$(N - 2G + 1 + N \bmod G - R) + G - 1 - N \bmod G,$$

$$RIV = R - R_{min}, RIV = W(x - x_{min}) + G -$$

$$1 - N \bmod G + R - R_{min} \text{ or}$$

$$RIV = W(x_{max} - x + 1) + W - 1 - (R - R_{min}) + G - 1 - N \bmod G,$$

wherein R represents the first parameter, x represents the second parameter, $x_{min}$ and $x_{max}$ respectively represent a minimum value and a maximum value of x, $R_{min}$ represents a minimum value of R, and $W=2N-(x_{min}+x_{max}+1)G+2-2R_{min}$.

5. The method of claim 4, wherein if x=1, the function is RIV=R, else if $$x - 1 \leq \left\lfloor \frac{N}{2G} \right\rfloor,$$

the function is $RIV=(N-2G+2+N \bmod G)(x-1)+G-1-N \bmod G+R$, otherwise, the function is $$RIV = (N - 2G + 2 + N \bmod G)\left(\left\lfloor \frac{N}{G} \right\rfloor - x + 1\right) +$$

$$(N - 2G + 1 + N \bmod G - R) + G - 1 - N \bmod G)),$$

or if $x=x_{min}$, the function is $RIV=R-R_{min}$, else if $$x - 1 \leq \left\lfloor \frac{x_{min} + x_{max}}{2} \right\rfloor,$$

the function is $RIV=W(x-x_{min})+G-1-N \bmod G+R-R_{min}$, otherwise, the function is $RIV=W(x_{max}-x+1)+W-1-(R-R_{min})+G-1-N \bmod G$, or if $$x - 1 \leq \left\lfloor \frac{x_{min} + x_{max}}{2} \right\rfloor,$$

the function is $RIV=W(x-x_{min})+G-1-N \bmod G+R-R_{min}$, otherwise, the function is $RIV=W(x_{max}-x+1)+W-1-(R-R_{min})+G-1-N \bmod G$.

6. The method of claim 1, wherein when the function is of the first and third parameters, and the first parameter indicates a starting identifier and the third parameter indicates an ending identifier of the sequence of resource blocks, the function is selected from one of:

$$RIV = \sum_{i=1}^{u} X(i) - s, RIV = \sum_{i=1}^{u} (X(i) - L + 1) - s,$$

$$\text{and } RIV = \frac{u(u-1)L}{2} + u - s,$$

wherein s represents the first parameter, X(i) represents the third parameter, and u and L are each a predefined positive integer.

7. The method of claim 1, wherein when the at least two of the first, second, and third parameters of the function are respectively represented as y and z, possible values of z are contiguous, possible values of y are non-contiguous, possible values of y are Y(1), Y(2) ... Y(V) that satisfy a condition of Y(1)<Y(2)< ... <Y(V), V is an predefined integer, and V≥1, a sum of numbers of the resource indication values that correspond to y=Y(i+1) and y=Y(V-i) is a constant and respective possible values of the resource indication value are contiguous, wherein 0≤i≤V-1, or a sum of numbers of the resource indication values that correspond to y=Y(i+1) and Y=Y(V+1-i) is a constant and respective possible values of the resource indication value are contiguous, wherein 1≤i≤V-1.

8. A method, comprising:
receiving, by a communication node, a resource indication value determined based on a combination of at least two of a first parameter, a second parameter, and a third parameter, the resource indication value indicative of respective identifiers a sequence of resource blocks to be allocated to the communication node, wherein a number of bits $$K = \log_2 \left\lfloor \frac{N}{G} \right\rfloor \left( N + 1 - \frac{G\left(\left\lfloor \frac{N}{G} \right\rfloor + 1\right)}{2} \right)$$

indicates possible resource indication values generated by the function with N representing a maximum number of available resource blocks that can be allocated to the communication node and G representing a predefined positive integer larger than 1; and based on the received resource indication value, determining the respective identifiers of the sequence of resource blocks allocated to the communication node.

9. The method of claim 8, wherein when the function is of the first and second parameters, and the first parameter indicates a starting identifier and the second parameter indicates a length of a sequence of resource blocks, respectively, the function is selected from one of:

$$RIV = (N - G + 2 + N \bmod G)(x - 1) + R,$$

$$RIV = (N - G + 2 + N \bmod G)\left(\left\lfloor \frac{N}{G} \right\rfloor - x\right) +$$
$$(N - G + 1 + N \bmod G - R)),$$

$$RIV = W(x - x_{min}) + R - R_{min},$$

and $W(x_{max} - x) + W - 1 - (R - R_{min}),$ wherein R represents the first parameter, x represents the second parameter, $x_{min}$ and $x_{max}$ respectively represent a minimum value and a maximum value of x, $R_{min}$ represents a minimum value of R, and $W = 2N - (x_{min} + x_{max})G + 2 - 2R_{min}$.

10. The method of claim 9, wherein if $$x \leq \left\lceil \frac{N - N \bmod G}{2G} \right\rceil, \text{ or } x \leq \left\lceil \frac{\lfloor N/G \rfloor}{2} \right\rceil, \text{ or } x \leq \left\lceil \frac{\lfloor N/G \rfloor + 1}{2} \right\rceil,$$

the function is $RIV=(N-G+2+N \bmod G)(x-1)+R$, otherwise, the function is $$RIV = (N - G + 2 + N \bmod G)\left(\left\lfloor \frac{N}{G} \right\rfloor - x\right) +$$
$$(N - G + 1 + N \bmod G - R)),$$

or if x satisfies:

$$x \leq \left\lfloor \frac{x_{min} + x_{max}}{2} \right\rfloor,$$

the function is $RIV=W(x-x_{min})+R-R_{min}$, otherwise, the function is $RIV=W(x_{max}-x)+W-1-(R-R_{min})$.

11. The method of claim 8, wherein when the function is of the first and second parameters, and the first parameter indicates a starting identifier and the second parameter indicates a length of the sequence of resource blocks, respectively, the function is selected from one of:

$$RIV = R,$$

$$RIV = (N - 2G + 2 + N \bmod G)(x - 1) + G - 1 - N \bmod G + R,$$

$$RIV = (N - 2G + 2 + N \bmod G)\left(\left\lfloor \frac{N}{G} \right\rfloor - x + 1\right) + N -$$
$$2G + 1 + N \bmod G - R) + G - 1 - N \bmod G),$$

$$RIV = R - R_{min},$$

$$RIV = W(x - x_{min}) + G - 1 - N \bmod G + R - R_{min}, \text{ or}$$

$$RIV = W(x_{max} - x + 1) + W - 1 - (R - R_{min}) + G - 1 - N \bmod G,$$

wherein R represents the first parameter, x represents the second parameter, G is a predefined positive integer larger than 1, and N represents a maximum number of available resource blocks that can be allocated to the communication node, $x_{min}$ and $x_{max}$ respectively represent a minimum value and a maximum value of x, $R_{min}$ represents a minimum value of R, and $W=2N-(x_{min}+x_{max}+1)G+2-2R_{min}$.

12. The method of claim 11, wherein if x=1, the function is RIV=R, else if $$x - 1 \leq \left\lfloor \frac{N}{2G} \right\rfloor,$$

the function is $RIV=(N-2G+2+N \bmod G)(x-1)+G-1-N \bmod G+R$, otherwise, the function is $$RIV = (N - 2G + 2 + N \bmod G)\left(\left\lfloor \frac{N}{G} \right\rfloor - x + 1\right) +$$
$$(N - 2G + 1 + N \bmod G - R) + G - 1 - N \bmod G)),$$

or if $x=x_{min}$, the function is $RIV=R-R_{min}$, else if $$x - 1 \leq \left\lfloor \frac{x_{min} + x_{max}}{2} \right\rfloor,$$

the predefined relationship is $W(x-x_{min})+G-1-N \bmod G+R-R_{min}$, otherwise, the function is $RIV=W(x_{max}-x+1)+W-1-(R-R_{min})+G-1-N \bmod G$, or if $$x - 1 \leq \left\lfloor \frac{x_{min} + x_{max}}{2} \right\rfloor,$$

the function is $RIV=W(x-x_{min})+G-1-N \bmod G+R-R_{min}$, otherwise, the function is $RIV=W(x_{max}-x+1)+W-1-(R-R_{min})+G-1-N \bmod G$.

13. The method of claim 8, wherein when the function is of the first and third parameters, and the first parameter indicates a starting identifier and the third parameter indicates an ending identifier of the sequence of resource blocks, the function is selected from one of:

$$RIV = \sum_{i=1}^{u} X(i) - s, \ RIV = \sum_{i=1}^{u} (X(i) - L + 1) - s,$$

$$\text{or } RIV = \frac{u(u-1)L}{2} + u - s,$$

wherein s represents the first parameter, X(i) represents the third parameter, and u and L are each a predefined positive integer.

14. The method of claim 8, wherein when the at least two of the first, second, and third parameters of the function are respectively represented as y and z, possible values of z are contiguous, possible values of y are non-contiguous, possible values of y are Y(1), Y(2) . . . Y(V) that satisfy a condition of Y(1)<Y(2)< . . . <Y(V), V is an predefined integer, and V≥1, a sum of numbers of the resource indication values that correspond to y=Y(i+1) and y=Y(V−i) is a constant and respective possible values of the resource indication value are contiguous, wherein 0≤i≤V−1, or a sum of numbers of the resource indication values that correspond to y=Y(i+1) and Y=Y(V+1−i) is a constant and respective possible values of the resource indication value are contiguous, wherein 1≤i≤V−1.

15. The method of claim 14, wherein the possible values of y form an arithmetic progression.

16. A first communication node, comprising:
at least one processor configured to determine a resource indication value based on a combination of at least two of a first parameter, a second, and a third parameter, the resource indication value indicative of respective identifiers of a sequence of resource blocks to be allocated to a second communication node, wherein a number of bits $$K = \log_2 \left\lfloor \frac{N}{G} \right\rfloor \left( N + 1 - \frac{G\left(\left\lfloor \frac{N}{G} \right\rfloor + 1\right)}{2} \right)$$

indicates possible resource indication values generated by the function with N representing a maximum number of available resource blocks that can be allocated to the second communication node and G representing a predefined positive integer larger than 1; and
a transmitter configured to transmit the resource indication value to the second communication node.

17. The first communication node of claim 16, wherein when the function is of the first and second parameters, and the first parameter indicates a starting identifier and the second parameter indicates a length of the sequence of resource blocks, respectively, the function is selected from one of:

$$RIV = (N - G + 2 + N \bmod G)(x - 1) + R,$$

$$RIV = (N - G + 2 + N \bmod G)\left(\left\lfloor \frac{N}{G} \right\rfloor - x\right) +$$

$$(N - G + 1 + N \bmod G - R)),$$

$$RIV = W(x - x_{min}) + R - R_{min}, \text{ or}$$

$$RIV = W(x_{max} - x) + W - 1 - (R - R_{min}),$$

wherein R represents the first parameter, x represents the second parameter, $x_{min}$ and $x_{max}$ respectively represent a minimum value and a maximum value of x, $R_{min}$ represents a minimum value of R, and W=2N−($x_{min}$+$x_{max}$)G+2−2$R_{min}$.

18. The first communication node of claim 16, wherein when the function is of the first and second parameters, and the first parameter indicates a starting identifier and the second parameter indicates a length of the sequence of resource blocks, respectively, the function is selected from one of:

$$R - V = R,$$

$$RIV =$$

$$(N - 2G + 2 + N \bmod G)(x - 1) + G - 1 - N \bmod G + R,$$

$$RIV = \left(N - 2G + 2 + N \bmod G\left(\left\lfloor \frac{N}{G} \right\rfloor - x + 1\right)\right) +$$

$$(N - 2G + 1 + N \bmod G - R) + G - 1 - N \bmod G),$$

$$RIV = R - R_{min}, W(x - x_{min}) + G - 1 - N \bmod G + R - R_{min}, \text{ or}$$

$$RIV = W(x_{max} - x + 1) + W - 1 - (R - R_{min}) + G - 1 - N \bmod G,$$

wherein R represents the first parameter, x represents the second parameter, $x_{min}$ and $x_{max}$ respectively represent a minimum value and a maximum value of x, $R_{min}$ represents a minimum value of R, and W=2N−($x_{min}$+$x_{max}$+1)G+2−2$R_{min}$.

19. The first communication node of claim 16, wherein when the function is of the first and third parameters, and the first parameter indicates a starting identifier and the second parameter indicates an ending identifier of the sequence of resource blocks, the function is selected from one of:

$$RIV = \sum_{i=1}^{u} X(i) - s, \sum_{i=1}^{u} (X(i) - L + 1) - s, \text{ and } \frac{u(u-1)L}{2} + u - s,$$

wherein s represents the first parameter, X(i) represents the third parameter, and u and L are each a predefined positive integer.

20. The first communication node of claim 17, wherein when the at least two of the first, second, and third parameters of the function are respectively represented as y and z, possible values of z are contiguous, possible values of y are non-contiguous, possible values of y are Y(1), Y(2) . . . Y(V) that satisfy a condition of Y(1)<Y(2)< . . . <Y(V), V is an predefined integer, and V≥1, a sum of numbers of the resource indication values that correspond to y=Y(i+1) and y=Y(V−i) is a constant and respective possible values of the resource indication value are contiguous, wherein 0≤i≤V−1, or a sum of numbers of the resource indication values that correspond to y=Y(i+1) and Y=Y(V+1−i) is a constant and respective possible values of the resource indication value are contiguous, wherein 1≤i≤V−1.

\* \* \* \* \*

UNITED STATES PATENT AND TRADEMARK OFFICE
CERTIFICATE OF CORRECTION

PATENT NO. : 11,184,898 B2
APPLICATION NO. : 16/709318
DATED : November 23, 2021
INVENTOR(S) : Wen Zhang et al.

It is certified that error appears in the above-identified patent and that said Letters Patent is hereby corrected as shown below:

In the Claims

In Claim 2, Column 19, Line 13, please delete "$W(x - x_{min}) + R - R_{min}$" and insert -- $RIV = W(x - x_{min}) + R - R_{min}$ --

In Claim 6, Column 20, Line 45, please delete "and" and insert -- or --

In Claim 9, Column 21, Line 35, please delete "and" and insert -- or --

In Claim 11, Column 22, Line 10, please delete "$+ N -$" and insert -- $+ (N -$ --

In Claim 18, Column 24, Line 18, please delete "$R - V = R$" and insert -- $RIV = R$ --

In Claim 18, Column 24, Line 26, please delete "$W(x - x_{min}) + G - 1 - N \bmod G + R - R_{min}$" and insert -- $RIV = W(x - x_{min}) + G - 1 - N \bmod G + R - R_{min}$ --

In Claim 19, Column 24, Line 24, please delete "$\frac{u(u-1)L}{2} + u - s$" and insert -- $RIV = \frac{u(u-1)L}{2} + u - s$ --

In Claim 19, Column 24, Line 42, please delete "$\sum_{i=1}^{u}(X(i) - L + 1) - s$" and insert -- $RIV = \sum_{i=1}^{u}(X(i) - L + 1) - s$ --

In Claim 19, Column 24, Line 42, please delete "and" and insert -- or --

Signed and Sealed this
Fifteenth Day of November, 2022

Katherine Kelly Vidal
*Director of the United States Patent and Trademark Office*